2,857,353

ASPARTIC ACID ESTERS AND COMPOSITIONS OF VINYL CHLORIDE POLYMERS PLASTICIZED THEREWITH

Joachim Dazzi, Dayton, Ohio, assignor to Monsanto Chemical Company, St. Louis, Mo., a corporation of Delaware No Drawing. Application December 9, 1953
Serial No. 397,271

7 Claims. (Cl. 260—30.8)

This invention relates to esters of N-(arylsulfonyl)-aspartic acids and to vinyl chloride polymers plasticized with the esters.

The new aspartates which I have found to possess high efficiency when employed as plasticizers for vinyl chloride polymers have the formula

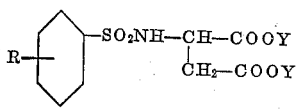

in which R is selected from the class consisting of hydrogen and alkyl radicals of from 1 to 4 carbon atoms and Y is an alkyl radical of from 6 to 14 carbon atoms. As illustrative of aspartates having the above formula may be mentioned di-n-hexyl N-(benzenesulfonyl)aspartate, didodecyl N-(4-toluenesulfonyl)aspartate, di-n-tetradecyl N-(2-toluenesulfonyl)aspartate, di(2-ethylhexyl) N-[(4-ethylbenzene)sulfonyl]aspartate, didecyl N-(3-toluenesulfonyl)aspartate, dinoyl N-[4-butylbenzene)-sulfonyl]aspartate, diheptyl N-[(2-propylbenzene)sulfonyl]aspartate, ditridecyl N-[(4-butylbenzene)sulfonyl]aspartate, diundecyl N-(benzenesulfonyl)aspartate, dodecyl octyl N-(2-toluenesulfonyl)aspartate, 2-butyloctyl hexyl N-(4-toluenesulfonyl)aspartate, etc.

The present N-(arylsulfonyl)aspartates are prepared according to the invention by contacting an appropriate N-(arylsulfonyl)aspartic acid or an acid halide thereof, such as the chloride or the bromide, with an unsubstituted, aliphatic saturated alcohol of from 6 to 14 carbon atoms, preferably in the presence of an esterifying agent. The N-arylsulfonic acids are obtainable by various known methods. I have found it most feasibl to prepare these acids by condensation of aspartic acid with an arylsulfonyl halide, the halide condensing preferentially at the amino group rather than at the carboxy group of the aspartic acid. The N-(arylsulfonyl)aspartic acids may be converted to the acyl halides thereof by known methods, e. g., by reaction with a thionyl halide such as thionyl chloride, and instead of the carboxylic acid, the acyl halide may be used in the esterification.

N-(arylsulfonyl(aspartic acids or the acyl halides thereof which are useful in the preparation of the present esters have the formula

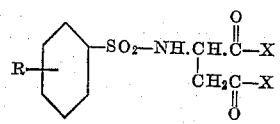

in which X is selected from the class consisting of —OH, Cl, I, and Br and R is selected from the class consisting of hydrogen and an alkyl radical of from 1 to 4 carbon atoms. As illustrative of acids and acyl halides having the above formula may be mentioned: N-(benzenesulfonyl)aspartic acid, N-(4-toluenesulfonyl)aspartic acid, N-(3-toluenesulfonyl)aspartoyl chloride, N-(benzenesulfonyl)aspartoyl iodide, N-(2-toluenesulfonyl)aspartic acid, N-[(4-ethylbenzene)sulfonyl]aspartic acid, N-[(4-isopropylbenzene)sulfonyl]aspartoyl bromide, N-[(3-tert-butylbenzene)sulfonyl]aspartic acid, etc.

Unsubstituted, aliphatic saturated alcohols of from 6 to 14 carbon atoms used in the condensation reaction with the above mentioned acids or acyl halides in the preparation of the present esters are, e. g., n-hexyl, n-heptyl, 2-ethylhexyl, n-octyl, n-nonyl, n-decyl, n-tridecyl, n-undecyl, n-dodecyl, 2-butyloctyl and tetradecyl alcohols. Mixtures of the alcohols may be used to obtain a mixture of esters. Also, mixed esters, for example, butyl dodecyl N-benzenesulfonylaspartate or amyl octyl N-4-toluenesulfonylaspartate are obtained by forming a half ester with one alcohol and then completing the esterification with another of these alcohols. Technical mixtures of branched-chain alcohols obtainable for example by the "Oxo" process or by hydrogenation of technical mixtures of higher fatty acids, such as coconut oil fatty acid, may also be used as the alcohol component in the preparation of the present esters.

Esterifying catalysts generally useful in the present process are acidic or alkaline materials generally, e. g., 4-toluenesulfonic acid, sulfuric acid, pyrophosphoric acid, hydrochloric acid, sodium methoxide, etc.

In preparing the present dialkyl N-(arylsulfonyl)aspartates I prefer to operate substantially as follows: The N-(arylsulfonyl)aspartate or an acyl halide thereof is mixed with the appropriate alcohol or mixture of alcohols and an esterifying catalyst in the presence or absence of an inert solvent or diluent, and the resulting mixture is allowed to stand at ordinary or increased temperatures until formation of the ester is substantially completed. Completion of the reaction may be readily ascertained by noting the quantity of water or hydrogen halide evolved in the reaction. While the temperature employed in the reaction varies with the individual nature of the reactants as well as with other reaction conditions such as degree of stirring, reactant quantity, etc., in most instances I have found it to be advantageous to heat the reaction mixture at a temperature of, say, from 50° C. to the refluxing temperature of the reaction mixture. When operating in the presence of a diluent, refluxing temperatures appear to give optimum yields. Inert solvents or diluents useful in the present process are liquid aliphatic or aromatic hydrocarbons or the chloro or nitro derivatives thereof, such as benzene, hexane, kerosene, hexachloroethane, 3,4-dichlorobenzene or nitrobenzene. High boiling ethers such as dioxane are also useful.

The present higher alkyl esters may also be prepared by an interchange reaction whereby a lower dialkyl ester of the N-(arylsulfonyl)aspartic acid, for example, the dimethyl ester is reacted with an unsubstituted, aliphatic saturated alcohol of from 6 to 14 carbon atoms in the presence of the esterifying catalyst. In both procedures, the formation of the present esters occurs to some extent at ordinary room temperatures; for good yields of the desired products, however, I prefer to operate at refluxing temperatures while removing from the reaction zone either the water or hydrogen halide which is given off during the direct esterification or the lower alcohol generated in the interchange reaction.

Dialkyl esters of N-(arylsulfonyl)aspartic acids in which the alkyl groups have from 6 to 14 carbon atoms are highly efficient plasticizers for vinyl chloride polymers. A wide variety of plasticizers has been employed for the purpose of improving the physical properties of vinyl chloride polymers. Particular attention has been given to the improvement of flexibility and heat and light stability of such plasticized compositions. In many instances the improvement in flexibilty has been obtainable only by sacrificing other desirable properties of an ideal polyvinyl chloride composition, such as low volatility, color and heat stability, water absorption, etc. I have found that very good flexibility, without sacrifice of temperature stability and low volatility, is imparted to vinyl chloride polymers when the new aspartates are employed as plasticizers for such polymers.

The present esters are valuable plasticizers for polyvinyl chloride and copolymers of at least 70 percent by weight of vinyl chloride and up to 30 percent by weight of an unsaturated monomer copolymerized therewith, for example vinyl acetate, vinylidene chloride, etc. I have found these esters serve not only to soften vinyl chloride polymers, but also to impart simultaneously a high degree of low temperature flexibility, very good temperature stability and great mechanical strength to these polymers. The present esters are compatible with vinyl chloride polymers and show no exudation of plasticizer even at plasticizer content of up to 50 percent. Although the quantity of plasticizer will depend upon the particular polymer to be plasticized and upon its molecular weight, it is generally found that compositions having from 5 percent to 50 percent by weight of plasticizer will, in most instances, be satisfactory for general utility. The good flexibility of the plasticized compositions increases with increasing plasticizer concentration.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from one to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in low temperature often results in decreased flexibility of a plasticized polymer composition, so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D–744–44T.

*Water resistance.*—The amount of water absorption and the amount of leaching that takes place when the plasticized composition is immersed in distilled water for 24 hours is determined.

The invention is further illustrated, but not limited, by the following examples:

*Example 1*

N-(4-toluenesulfonyl)aspartic acid was prepared in known manner by heating 4-toluenesulfonyl chloride with aspartic acid.

A mixture consisting of 60 g. (0.2 mole) of the acid, 1 mole of 2-ethylhexanol, 30 ml. of benzene and 1.0 g. of 4-toluenesulfonic acid (as catalyst) was refluxed for 3 hours, during which time 9.8 g. of reaction water was collected. Filtration of the resulting reaction mixture to remove a small amount of undissolved material, washing of the filtrate with 5% aqueous sodium carbonate and then with water until neutral, and removal of the solvent and unreacted material by distillation to a temperature of 220° C./1–2 mm., gave as residue 89.1 g. of crude product. This was purified by treatment with 4 g. of clay and 2 g. of a filter aid to give 83.6 g. (81.6% theoretical yield) of the substantially pure bis(2-ethylhexyl) N-(4-toluenesulfonyl)aspartate, $N_D^{25}$ 1.4877, and having a saponification equivalent of 247.56.

The reaction of other alcohols of from 6 to 14 carbon atoms, instead of 2-ethylhexanol, with N-(4-toluenesulfonyl)aspartic acid is effected similarly; as with tert-dodecanol to give di-tert-dodecyl N-(4-toluenesulfonyl)-aspartate or with hexanol to give dihexyl N-(4-toluenesulfonyl)aspartate. Other N-(arylsulfonyl)aspartic acids may be used instead of the N-(4-toluenesulfonyl)aspartic acid, e. g., with N-(benzenesulfonyl)aspartic acid and heptanol or tridecanol there is obtained diheptyl or di-tridecyl N-(benzenesulfonyl)aspartate.

*Example 2*

Sixty parts of polyvinyl chloride and 40 parts by weight of bis(2-ethylhexyl) N-(4-toluenesulfonyl)aspartate were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gives a value of minus 7.5° C. which value denotes good low temperature properties. Testing of the volatility characteristics of the plasticized composition gives a value of 1.48 percent, which value denotes extremely good volatility characteristics. The plasticized material had a hardness of 77 before the volatility test and a hardness of 73 after the volatility test. When subjected to heat at a temperature of 325° C. for a period of 30 minutes the clarity and color of the molded product were substantially unchanged. Tests of the water-resistance properties of the plasticized material employing the test procedure described above showed a solids-loss of only 0.03 percent and an 0.28 percent water absorption value.

Instead of the esters employed in the example above, other dialkyl N-(arylsulfonyl)aspartates having from 6 to 14 carbon atoms in each of the alcohol residues thereof may be used to give similarly valuable plasticized polyvinyl chloride compositions. Thus, by employing 40 parts by weight of bis(2-butyloctyl) or di-*n*-octyl N-(benzenesulfonyl)aspartate or N-[(4-ethylbenzene)sulfonyl]-aspartate with 60 parts by weight of polyvinyl chloride or with 60 parts by weight of a vinyl chloride-vinyl acetate copolymer known to the trade as "Vinylite," there may be obtained clear, colorless compositions of very good flexibility and stability.

While the above examples show only a composition in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from 10 percent to 20 percent is preferred. The present esters are compatible with polyvinyl chloride over a wide range of concentrations, up to 50 percent of esters based on the total weight of the plasticized composition yielding desirable products.

Although the invention has been described particularly with reference to the use of the present dialkyl N-(arylsulfonyl)- aspartates as plasticizers for polyvinyl chloride, these esters may be advantageously employed also as plasticizers for copolymers of vinyl chloride, for example, the copolymers of vinyl chloride with vinyl acetate or vinylidene chloride. Preferably, such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such additives in the plasticized materials does not impair the valuable properties of the present esters. The present esters are of general utility in softening vinyl chloride polymers. This may be used as the only plasticizing component in a compounded vinyl chloride polymer or they may be used in conjunction with other plasticizers.

What I claim is:

1. A resinous composition comprising a vinyl chloride polymer containing at least 70 percent by weight of vinyl chloride plasticized with an ester having the formula

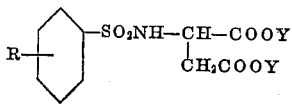

in which R is selected from the class consisting of hydrogen and alkyl radicals of from 1 to 4 carbon atoms and Y is an alkyl radical of from 6 to 14 carbon atoms.

2. A resinous composition comprising polyvinyl chloride plasticized with an ester of the formula

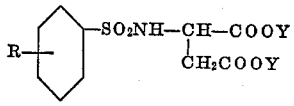

in which R is selected from the class consisting of hydrogen and alkyl radicals of from 1 to 4 carbon atoms and Y is an alkyl radical of from 6 to 14 carbon atoms.

3. A resinous composition comprising a copolymer of at least 70% by weight of vinyl chloride and up to 30% by weight of an unsaturated monomer copolymerizable therewith, said copolymer being plasticized with an ester having the formula

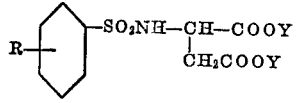

in which R is selected from the class consisting of hydrogen and alkyl radicals of from 1 to 4 carbon atoms and Y is an alkyl radical of from 6 to 14 carbon atoms.

4. A resinous composition comprising polyvinyl chloride plasticized with bis(2-ethylhexyl) N-(4-toluenesulfonyl)aspartate.

5. An ester having the formula

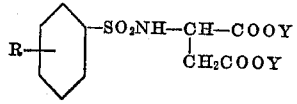

in which R is selected from the class consisting of hydrogen and alkyl radicals of from 1 to 4 carbon atoms and Y is an alkyl radical of from 6 to 14 carbon atoms.

6. A dialkyl N-(toluenesulfonyl)aspartate in which the alkyl radical has from 6 to 14 carbon atoms.

7. Bis(2-ethylhexyl) N-(4-toluenesulfonyl)aspartate.

References Cited in the file of this patent

UNITED STATES PATENTS 2,591,518  Dazzi ---------------- Apr. 1, 1952

OTHER REFERENCES

Gurin et al.: J.A.C.S., volume 58, 2104–6 (1936).
McChesney et al.: J.A.C.S., volume 59, 1116–1118 (1937).
Shriner et al.: Indentification of Organic Compounds, 1948, page 245.
Cocker: J. Chem. Soc. (London), 1940, pages 1489–91.